(12) United States Patent
Travis

(10) Patent No.: US 6,870,671 B2
(45) Date of Patent: Mar. 22, 2005

(54) FLAT-PANEL DISPLAY

(75) Inventor: Adrian Robert Leigh Travis, Wrangaton (GB)

(73) Assignee: Cambridge 3D Display Limited, London ( * ) Notice: Subject to any disclaimer, the term of this patent is extended or adjusted under 35 U.S.C. 154(b) by 134 days.

(21) Appl. No.: 10/398,498

(22) PCT Filed: Oct. 3, 2001

(86) PCT No.: PCT/GB01/04444

§ 371 (c)(1),
(2), (4) Date: Apr. 3, 2003

(87) PCT Pub. No.: WO02/29772

PCT Pub. Date: Apr. 11, 2002

(65) Prior Publication Data

US 2004/0004761 A1 Jan. 8, 2004

(30) Foreign Application Priority Data

Oct. 3, 2000 (GB) .............................................. 0024112

(51) Int. Cl.$^7$ ............................ G03B 21/14; H04N 5/66
(52) U.S. Cl. ........................ 359/443; 353/37; 353/122; 348/804; 385/901
(58) Field of Search ............................. 353/31, 37, 94, 353/98, 99, 122; 348/804; 359/443; 385/901

(56) References Cited

U.S. PATENT DOCUMENTS

| | | | |
|---|---|---|---|
| 3,634,614 A | 1/1972 | Geusic et al. | |
| 5,891,361 A | 4/1999 | Kane | |
| 6,457,834 B1 * | 10/2002 | Cotton et al. | 353/122 |
| 6,519,400 B2 * | 2/2003 | Biscardi et al. | 385/120 |
| 6,608,961 B2 * | 8/2003 | Travis | 385/146 |
| 6,751,019 B2 * | 6/2004 | DeSanto et al. | 359/460 |
| 2002/0008854 A1 | 1/2002 | Travis | |

FOREIGN PATENT DOCUMENTS

| WO | WO 00 04407 A1 | 1/2000 |
|---|---|---|
| WO | WO 01/72037 A1 | 9/2001 |

OTHER PUBLICATIONS

Alexandra Rapaport, Ferenc Szipocs, Janet Milliez, Hans Jenssen and Michael Bass; "Optically Written Displays Based on Up–Conversion of Near Infrared Light".

* cited by examiner

*Primary Examiner*—W. B. Perkey
(74) *Attorney, Agent, or Firm*—Garvey, Smith, Nehrbass & Doody, LLC; Gregory C. Smith

(57) ABSTRACT

A flat-panel display comprises a projector (21–23) illuminated by a collimate light source such as an infra-red laser, a waveguide (1) which ejects rays at a distance along the axis of propagation related to their angle of injection into the edge of the waveguide, an input slab (3) for magnifying the projected image in the width dimension in the plane of the panel perpendicular to the axis of propagation, and a phosphor output screen which converts the infra-red light to the visible. The use of monochromatic light within the waveguide reduces dispersion problems, and the use of a triad of projectors, each injecting at a different angle, makes registration relatively simple.

16 Claims, 1 Drawing Sheet

FLAT-PANEL DISPLAY

This invention relates to a way of making a flat-panel display by using a laser diode to project the image from a microdisplay into a tapered panel.

Flat-panel displays which have screens large enough to stimulate the quick reactions of our peripheral vision will give pictures great immediacy, yet because they are flat the displays will fit easily onto the wall of a room. The size of conventional flat-panel displays however is limited by the resistor/capacitor time constant of the row and column transparent conductors, and by the area over which lithography can be sufficiently precise to make transistors. The cost of making active-matrix liquid-crystal displays with screen diagonals greater than one metre is prohibitive, and even the cheaper plasma displays are too expensive for most uses, but costs reduce considerably with size and the 2" by 2" (5 cm×5 cm) liquid-crystal displays used in video projectors are relatively cheap, while fingernail-sized microdisplays look set to cost only a few dollars.

Video projectors comprise a two-dimensional display, a projection lens and a translucent screen, the projection lens forming on the translucent screen a magnified image of the two-dimensional display which can be almost as big as one wants. Video projectors are cheap, so are becoming increasingly popular, but if the projector is pointed at the front of the translucent screen then often the projector gets in the way of the viewer, or the viewer gets in the way of the projected light. Furthermore, unless the room lights are dimmed, the image looks washed out because the screen scatters background light as well as the projected image. The projector can instead be pointed at the rear of the screen so that there is nothing between the viewer and the screen, and the screen made to scatter only light incident on its rear, but rear-projection displays are bulky.

Recently there was disclosed in PCT/GB01/01209 a tapered display which comprises a video projector and a sheet of glass tapering in one direction. The video projector is itself composed of a source of approximately collimated illumination, a microdisplay, a condensing lens and a projection lens, and as the rays leave the projection lens they form a narrow waist. At this point the rays are passed into the thick end of the tapered sheet of glass. When a ray is shone into the thick end of a sheet of glass which tapers, then the out-of-plane angle measured with respect to one face of the taper will change each time the ray reflects off the opposite face of the taper. Eventually, as the ray propagates far enough along the taper, the out-of-plane angle becomes greater than the critical angle, and at this point light escapes the taper. The distance into the tapered sheet of glass at which the ray leaves the taper is therefore determined by the angle at which the ray is injected. In this way the 2D array of pixels on the microdisplay is mapped one-to-one to a 2D array of pixels on the face of the tapered waveguide. An anti-reflection coating is needed to ensure that all the light leaves the screen when the ray reaches the critical angle, since otherwise there is blurring between adjacent rows of the image.

The tapered display shares many of the advantages of a rear-screen projection display, but works better with laser illumination than with illumination from an incoherent white light source. This is first because white light is not collimated, and secondly because it comprises many wavelengths so the anti-reflection coating has to be more complicated and is more expensive. Red, green and blue lasers are getting more powerful and cheaper, but are likely to be more expensive than arc-lights for several years, and a coating designed even for just three wavelengths is complicated.

Recently there was disclosed by A Rapaport, F Szipocs, J Milliez, H Jenssen, M Bass, K Schafer and K Belfield in "Optically Written Displays Based on Up-Conversion of Near Infrared Light", Conference record of the 20th International Display Research Conference of the Society for Information Display, pages 111 to 114, a way of making a video display in which the beam from a modulated 975 nm infra-red laser was scanned across a screen of $Yb^{3+}$ ions which absorbed the light and transferred the energy to dopant ions which fluoresced at visible wavelengths. Infra-red laser diodes are powerful and relatively cheap, and red, green and blue emissions were demonstrated using $Tm^3$, $Ho^3$ and $Er^3$ ions respectively in a $NaYF_4$ host with the potential for high optical efficiency, but the way in which the image is projected is bulky.

According to the present invention there is provided a flat-panel display comprising a projector illuminated by a collimated light source such as an infra-red laser, a waveguide which ejects rays at a distance along the axis of propagation, that is related to their angle of injection into an edge of the panel, means, preferably between the projector and the waveguide, for magnifying the projected image in the width direction (i.e. the dimension in the plane of the panel perpendicular to the axis of propagation), and an output screen which converts the infra-red or other source light to the visible.

Using the invention it is possible to use a single, cheap, high-power laser, which is well adapted as an input device for the wedge-shaped waveguide, and still obtain a full-colour image. The output screen can be made of phosphor material, in RGB pixels for a colour image, which has the advantage of emitting uniformly in all directions, giving an easily visible image. Infra-red light is advantageous because most useful glass and plastics materials are transparent to it. Monochomatic or narrow-band light is advantageous because of the absence of dispersion and the greater simplicity of coatings such as antireflection coatings.

For a better understanding of the invention embodiments will now be described by way of example with reference to the accompanying drawings, in which:

FIG. 1 illustrates the principle of light escape from a tapered panel, at a location dependent on the out-of-plane angle of injection. This principle is used in PCT/GB01/01209 to make a flat-panel 2-D display.

Figure 1:
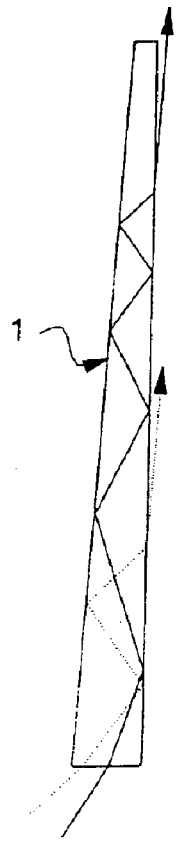
FIG. 1 illustrates how the distance which a ray of light propagates along a tapered waveguide is determined by the angle at which the ray is injected.
Figure 2:
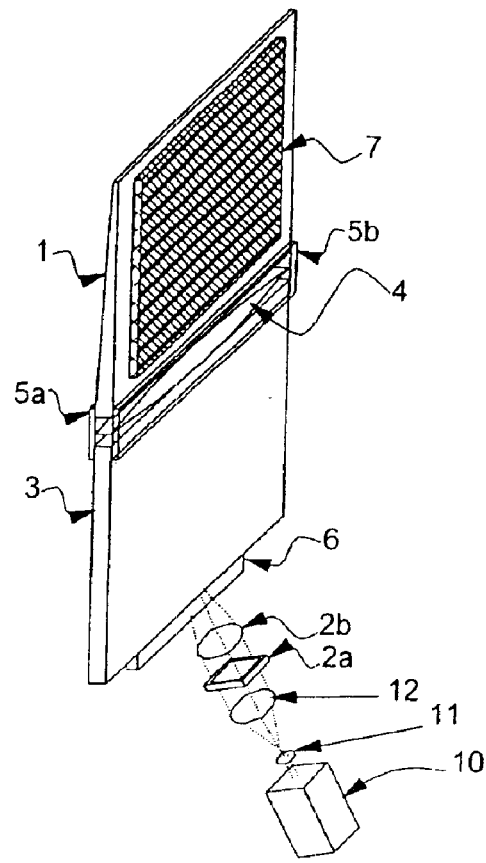
FIG. 2 illustrates how a screen of up-converting phosphors and a tapered display illuminated by an infra-red laser diode can give a visible picture.

In FIG. 2 the beam from an infra-red laser diode, 10, is expanded by an inverted telescope pair of lenses 11, 12 then passed into a video projector comprising a microdisplay 2a and a condensing lens 2b. The modulated rays, reflected by a mirror 6, then enter the edge of a wedge-shaped slab of glass or transparent plastic 3 to which they are confined by total internal reflection at the glass/air interface. The rays propagate within the plane of the slab so that the ray bundle has expanded to the width of the slab 3 by the time they reach its end. The rays may then optionally be collimated by a cylindrical lens 4 sandwiched on each face of the slab between a pair of front silvered mirrors 5a, 5b, and then they enter the thick end of a tapered sheet of glass 1. The front (viewer-side) surface of this tapered sheet of glass 1 is coated with an anti-reflection coating tuned to the wavelength of the laser diode 10 so that rays leave the tapered sheet 1 as soon as they reach the critical angle, and the rays are then incident on a sheet of up-converting phosphors 7 and produce a magnified image in visible light of the pattern modulated by the microdisplay.

A colour picture is desirable and to this end the phosphor screen 7 could be patterned with a mosaic of red, green and blue up-converting phosphors and the microdisplay registered to these so that one colour or another could be controllably illuminated. However, this would require precise registration of the microdisplay and phosphor screen. Alternatively a shadow mask could be used in the same way as for a cathode-ray tube, but this wastes light.

Figure 3:
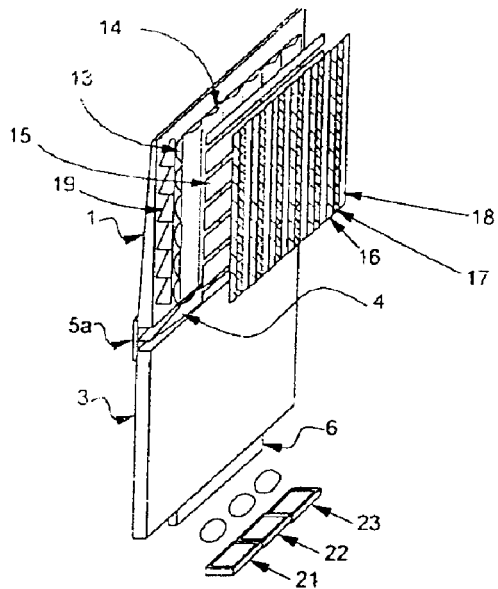
FIG. 3 illustrates how each of three video projectors can be used to illuminate pixels from one set each of three sets of phosphors.

FIG. 3 shows how three microdisplays 21, 22, 23, each illuminated by an infra-red laser diode (not shown), can control one colour each on the screen 7 via a set of lenses. Rays from each of the microdisplays 21, 22, 23 project up through the slab 6 and are collimated by the cylindrical lens 4 so that the rays from each microdisplay have the same in-plane angle, but one which is different from that for rays from the other microdisplays. Consequently as they emerge from the wedge 1, rays from any one microdisplay will have a distinct azimuthal angle. A series of prisms 19 bends the rays into the horizontal plane (i.e. perpendicular to the slab), and then a vertical array of cylindrical microlenses 14 is used to focus the rays to sets of points in vertical columns, and one up-conversion phosphor colour is placed at these sets of points. The same is done in turn for the other microdisplays, so that microdisplay 21 modulates phosphors 18, microdisplay 22 modulates phosphors 17, and microdisplay 23 modulates phosphors 16.

Phosphors emit light in all directions, and it is desirable that light emitted to the rear of the screen be reflected back towards the front. However if a simple mirror is placed behind the phosphors, this will also reflect the infra-red light intended to illuminate them. One solution is to use a dichroic mirror which transmits infra-red light and reflects the visible, but dichroic mirrors are expensive. Instead, FIG. 3 shows a horizontal array of cylindrical microlenses 13 between the prisms 19 and the vertical lenses 14 which focus the incident infra-red light through horizontal slits in a mirror 15. Because these slits are small, most of the visible light from the phosphors is reflected back towards the front of the screen.

Figure 4:
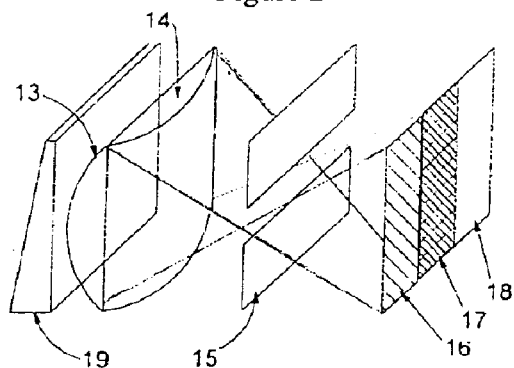
FIG. 4 is a close-up of the phosphor system of FIG. 3.

FIG. 4 shows an expanded view of one RGB colour pixel of the phosphor screen. The RGB phosphors can be of the type described by Rapaport et al. However, they could also be excited by UV radiation. It should be noted that although ultra-violet lasers are still expensive and weak, mercury discharge lamps emit light with a narrow linewidth and from such a small aperture that it can be moderately well collimated with a parabolic mirror. Conventional phosphors can be used to convert this ultra-violet light to the visible, and the layouts of FIGS. 2, 3, and 4 will work also with ultra-violet light.

What is claimed is:

1. A flat-panel display comprising a projector (2a, 12; 21–23) illuminated by a collimated light source such as an infra-red laser (10), a waveguide (1) which ejects rays at a distance along the axis of propagation that is related to their angle of injection into an edge of the waveguide, means (3) for magnifying the projected image in the dimension in the plane of the panel perpendicular to the axis of propagation, and an output screen (7) which converts the collinated light to the visible.

2. A flat-panel display according to claim 1, in which the waveguide (1) is a tapered slab of transparent material.

3. A flat-panel display according to claim 2, in which the output screen (7) is a phosphor sheet on or near one face of the slab.

4. A flat-panel display according to claim 3, in which the phosphors are RGB phosphors in columns parallel to the direction of propagation along the slab, and the projector has three corresponding colour projectors (21–23) injecting at different in-plane angles.

5. A flat-panel display according to claim 4, further including means (14) for converging light from each projector on to columns of the corresponding phosphor.

6. A flat-panel display according to claim 5, in which the light approaching the phosphors is converged, e.g. by a set of cylindrical microlenses (13), and made to pass through corresponding slits in the row direction, so that little light emitted backwards from the phosphors passes back into the waveguide system.

7. A flat-panel display according to claim 3, in which the or each projector is an IR laser and the phosphors are up-converting phosphors.

8. A flat-panel display comprising a projector (2a, 12; 21–23) illuminated by a collimated light source, a waveguide (1) in the form of a panel having an edge, which ejects rays at a distance along the axis of propagation that is related to their angle of injection into the said edge of the waveguide, means (3) for magnifying the projected image in the dimension in the plane of the panel perpendicular to the axis of propagation, and an output screen (7) which converts the light ejected from the waveguide to visible light.

9. A flat-panel display according to claim 8, in which the waveguide (1) is a tapered slab of transparent material.

10. A flat-panel display according to claim 9, in which the output screen (7) is a phosphor sheet on or near one face of the slab.

11. A flat-panel display according to claim 10, in which the phosphors are RGB phosphors in columns parallel to the direction of propagation along the slab, and the projector has three corresponding colour projectors (21–23) injecting at different in-plane angles.

12. A flat-panel display according to claim 11, further including means (14) for converging light from each projector on to columns of the corresponding phosphor.

13. A flat-panel display according to claim 12, in which the light approaching the phosphors is converged, and made to pass through corresponding slits in the row direction, so that little light emitted backwards from the phosphors passes back into the waveguide system.

14. A flat-panel display according to claim 10, in which the or each projector comprises an IR laser and the phosphors are up-converting phosphors.

15. A flat-panel display according to claim 13, wherein the light approaching the phosphors is converged by a set of cylindrical microlenses.

16. A flat-panel display comprising:

a projector (2a, 12; 21–23) including a collimated light source in the form of a laser (10), a panel-shaped ejecting waveguide (1) having an edge into which light is injected from the laser so that it propagates along an axis, while being confined by total internal reflection, and which ejects rays at a distance along the axis of propagation that is related to their angle of injection into the said edge of the waveguide, the ejecting waveguide having an anti-reflection coating tuned to the wavelength of the laser light;

a slab waveguide (3), having the same width as the ejecting waveguide, for magnifying the projected image from the projector in the dimension in the plane of the panel perpendicular to the axis of propagation before it is injected into the ejecting waveguide; and an output screen (7) in the form of a phosphor sheet on or near one face of the panel-shaped waveguide, which converts the ejected light to the visible.

* * * * *

UNITED STATES PATENT AND TRADEMARK OFFICE
CERTIFICATE OF CORRECTION

| | |
|---|---|
| PATENT NO. | : 6,870,671 B2 |
| APPLICATION NO. | : 10/398498 |
| DATED | : March 22, 2005 |
| INVENTOR(S) | : Adrian Robert Leigh Travis |

It is certified that error appears in the above-identified patent and that said Letters Patent is hereby corrected as shown below:

Claim 1 column 3, line 56, "collinated" should read --collimated--

Signed and Sealed this

Twenty-fifth Day of September, 2007

JON W. DUDAS
*Director of the United States Patent and Trademark Office*